(12) United States Patent
Hicks et al.

(10) Patent No.: US 10,563,150 B2
(45) Date of Patent: Feb. 18, 2020

(54) PURIFICATION OF RENDERED FATS WITH ADSORBENT MATERIALS

(71) Applicants: George E. Hicks, Elizabeth, IN (US); Brian S. Cooke, Sellersburg, IN (US)

(72) Inventors: George E. Hicks, Elizabeth, IN (US); Brian S. Cooke, Sellersburg, IN (US)

(73) Assignee: The Dallas Group of America, Inc., Whitehouse, NJ (US)

( * ) Notice: Subject to any disclaimer, the term of this patent is extended or adjusted under 35 U.S.C. 154(b) by 0 days.

(21) Appl. No.: 16/250,070

(22) Filed: Jan. 17, 2019

(65) Prior Publication Data

US 2019/0249110 A1    Aug. 15, 2019

Related U.S. Application Data

(60) Provisional application No. 62/631,105, filed on Feb. 15, 2018.

(51) Int. Cl.
| | | |
|---|---|---|
| *C11B 3/10* | (2006.01) | |
| *B01J 20/28* | (2006.01) | |
| *B01J 20/10* | (2006.01) | |

(52) U.S. Cl.
CPC ............... *C11B 3/10* (2013.01); *B01J 20/10* (2013.01); *B01J 20/28004* (2013.01); *B01J 20/28011* (2013.01); *B01J 20/28061* (2013.01); *B01J 20/28064* (2013.01)

(58) Field of Classification Search
CPC ........ C11B 3/10; B01J 20/10; B01J 20/28004
USPC ........................................................ 554/191
See application file for complete search history.

(56) References Cited

U.S. PATENT DOCUMENTS

| | | | |
|---|---|---|---|
| 4,681,768 A * | 7/1987 | Mulflur | C11B 3/10 426/417 |
| 5,006,356 A | 4/1991 | Munson | |
| 5,597,600 A * | 1/1997 | Munson | C11B 3/10 426/330.6 |
| 6,312,598 B1 | 11/2001 | Munson et al. | |
| 6,482,326 B2 | 11/2002 | Munson et al. | |
| 7,635,398 B2 | 12/2009 | Bertram et al. | |
| 9,295,810 B2 | 3/2016 | Hicks et al. | |

* cited by examiner

*Primary Examiner* — Deborah D Carr
(74) *Attorney, Agent, or Firm* — Raymond J. Lillie

(57) ABSTRACT

A method of purifying a rendered fat by contacting the rendered fat with at least one adsorbent material, such as magnesium silicate. The at least one adsorbent material may be used alone or in combination with other purifying materials, such as an acid. Such method provides for improved removal of impurities, such as polyethylene, phosphorus-containing compounds, chlorophyll, metals, soap, and sterol glucosides from the rendered fat.

39 Claims, No Drawings

PURIFICATION OF RENDERED FATS WITH ADSORBENT MATERIALS

This application claims priority based on Provisional Application Ser. No. 62/631,105, filed Feb. 15, 2018, the contents of which are incorporated by reference in their entirety.

This invention relates to the purification of rendered fats, such as rendered animal fats, from various sources. More particularly, this invention relates to the purification of a rendered fat by contacting the rendered fat with at least one adsorbent material, either alone or in combination with at least one acid.

Animal fats, such as tallow, are used in a wide range of products, including biodiesel, pet food, and soap. Polyethylene is a contaminant in rendered animal fats, primarily from meat wrappers. Upon thermal processing, polyethylene melts and remains with the fat where it creates problems with processing equipment, finished product quality, and a general downgrading of the value of the fat.

Due to the nature of the rendering industry, polyethylene is found in most rendered animal fat. It is a contaminant, the sources of which may be meat trays mixed with fat scraps and trimmings collected from grocery stores and other meat trimming operations. During the rendering process, meat wrappers are mixed in with the raw material melt. The polyethylene in the wrappers has a low enough density and it melts at a relatively low temperature and stays soluble in the rendered fat. This soluble polyethylene creates problems with processing equipment, finished product quality, and a general downgrading of the value of the fat.

Many tallow consumers can accept up to 30 parts per million (ppm) of polyethylene while others can accept up to 200 ppm. The difficulty with polyethylene is that it does not stay in solution in all stages of a manufacturing process. It there is a sharp drop in temperature, the polyethylene will come out of solution. Particularly, during soap manufacturing, polyethylene has been known to adhere to the inside wall of pipes, and then flakes off later and appears in the finished soap bars. Also, polyethylene can cause blockages in fatty acid manufacturing plants and coat the catalyst, create issues with the cold soak properties of finished biodiesel, and create negative consumer perceptions of pet foods.

In order to remove hot polyethylene in solution with the fat, the renderer first must chill the fat to a temperature at which the polyethylene comes out of solution. The polyethylene then can be separated physically from the fat by filtration or centrifuging. The process is energy inefficient, time consuming, and costly.

It is an object of the present invention to allow the renderer to remove hot soluble polyethylene and other impurities from rendered fat at elevated process temperatures using an adsorbent and/or an acid.

In accordance with an aspect of the present invention, there is provided a method of purifying a rendered fat. The method comprises contacting the rendered fat with a least one adsorbent material.

The term "rendered fat", as used herein, means a material that contains inedible and/or edible fat obtained from waste animal tissue, along with other impurities and contaminants resulting from the initial processing and/or collection of such waste animal tissue. Waste animal tissue containing such inedible and/or edible fat includes, but is not limited to waste animal tissue from slaughter houses, butcher shop trimmings, table scraps from restaurants, packages of expired meat and/or bone products from grocery stores, fatty animal tissue, animal bones, eyes, tongue, offal (i.e., intestines), animal carcasses, and restaurant grease. Animal sources include, but are not limited to: beef, pork, sheep, ox, poultry, seafood, venison, elk, bear, rattlesnake, and alligator. It is to be understood, however, that the scope of the present invention is not to be limited to any particular type or source of rendered fat.

In a non-limiting embodiment, the at least one adsorbent material is selected from the group consisting of magnesium silicate (including both natural and synthetic magnesium silicate), magnesium aluminum silicate, calcium silicate, sodium silicates, activated carbon, silica gel, magnesium phosphate, metal hydroxides, metal oxides, metal carbonates, sodium sesquicarbonate, metal silicates, bleaching clays, bleaching earths, bentonite clay, alumina, and mixtures thereof.

In a non-limiting embodiment, the at least one adsorbent material is magnesium silicate.

In one non-limiting embodiment, the magnesium silicate has the following properties:

| | |
|---|---|
| Loss on Ignition | 15% max (dry basis) |
| % MgO | 15% min. (ignited basis) |
| % $SiO_2$ | 67% min. (ignited basis) |
| Soluble salts | 3% max. |
| Mole ratio MgOP:$SiO_2$ | 1:1.36 to 1:3.82 |

In another non-limiting embodiment, the magnesium silicate is an amorphous, hydrated, precipitated, synthetic magnesium silicate having a surface area of at least 300 square meters per gram. In another non-limiting embodiment, the magnesium silicate has a surface area from about 400 square meters per gram to about 700 square meters per gram. In yet another non-limiting embodiment, the magnesium silicate has a surface area from about 400 square meters per gram to about 600 square meters per gram. In addition, such magnesium silicate may be employed as coarse particles, with at least 75%, and preferably at least 85% of the particles having a particle size which is greater than 400 mesh, and with no more than 15%, and preferably no more than 5%, all by weight, having a particle size greater than 40 mesh. In most cases, the average particle size of the magnesium silicate employed in accordance with the present invention is in the order of but not limited to 20-175 microns. It is to be understood, however, that the magnesium silicate may have a particle size different than the sizes mentioned hereinabove.

In addition, the amorphous, hydrated, precipitated magnesium silicate which is employed in accordance with a non-limiting embodiment of the present invention generally has a bulk density in the order of from 15-35 lbs./cu. ft., a pH of 3-10.8 (5% water suspension) and a mole ratio of MgO to $SiO_2$ of 1:1.0 to 1:4.0.

The following is a specification and typical value for a magnesium silicate which is employed in accordance with a non-limiting embodiment of the present invention.

| Parameter | Specification | Typical Value |
|---|---|---|
| Loss on Ignition at 900° C. | 15% max. | 12% |
| Mole Ratio MgO:$SiO_2$ | 1:2.25 to 1:2.75 | 1:2.60 |
| pH of 5% Water Suspension | 9.5 ± 0.5 | 9.8 |
| Soluble Salts % by wt. | 3.0 max. | 1.0% |
| Average Size, Microns | | 55 |
| Surface Area (B.E.T.) | 300 $m^2$/g (min.) | 400 |
| Refractive Index | | Approx. 1.5 |

A representative example of such an amorphous, hydrated, precipitated synthetic magnesium silicate having a surface area of at least 300 square meters per gram is available as Magnesol® Polysorb 30/40, a product of the Dallas Group of America, Inc., Whitehouse, N.J., and also is described in U.S. Pat. No. 4,681,768.

In another non-limiting embodiment, the magnesium silicate is a magnesium silicate which has a surface area of no more than 150 square meters per gram. In another non-limiting embodiment, the magnesium silicate has a surface area from about 50 square meters per gram to about 150 square meters per gram. In a non-limiting embodiment, the magnesium silicate has a surface area such a magnesium silicate has a mole ratio of MgO to $SiO_2$ of from about 1:3.0 to about 1:3.8, and a pH (5% water suspension) of from about 9.5 to about 10.5. An example of such a magnesium silicate is available as Magnesol® HMR-LS, a product of the Dallas Group of America, Inc., Whitehouse, N.J.

In another non-limiting embodiment, the magnesium silicate is an amorphous, hydrous, precipitated synthetic magnesium silicate, which has a pH less than about 9.0. As used herein, the term "precipitated" means that the amorphous hydrated precipitated synthetic magnesium silicate is produced as a result of precipitation formed upon the contact of a magnesium salt and a source of silicate in an aqueous medium.

For purposes of the present invention, the pH of the magnesium silicate is the pH of the magnesium silicate as measured in a 5% slurry of the magnesium silicate in water. The pH of the magnesium silicate in a 5% slurry may be from about 8.2 to about 8.9, and more preferably from about 8.5 to about 8.8, and most preferably is about 8.5. Examples of such amorphous hydrous precipitated synthetic magnesium silicates are described in U.S. Pat. No. 5,006,356, and also are available as Magnesol® R30, Magnesol® R60, and D-SOL® D60 products of the Dallas Group of America, Inc., Whitehouse, N.J. Magnesol® R30 has an average particle size of 30 microns, and Magnesol® R60 and D-SOL® D60 have an average particle size of 60 microns.

In a further non-limiting embodiment, the magnesium silicate has a pH (5% water suspension) of from about 9.0 to about 9.5. In another non-limiting embodiment, the magnesium silicate may be in the form of talc.

It is to be understood, however, that the scope of the present invention is not to be limited to any specific type of magnesium silicate or method for the production thereof.

In a non-limiting embodiment, the rendered fat is contacted with the at least one adsorbent material at a temperature of from about 180° F. to about 260° F.

In general, the rendered fat is contacted with the at least one adsorbent material, in an amount effective to remove impurities from the rendered fat. In a non-limiting embodiment, the rendered fat is contacted with the at least one adsorbent material in an amount of from about 0.01 wt. % to about 5.0 wt. %, based on the weight of the rendered fat. In another non-limiting embodiment, the rendered fat is contacted with the at least one adsorbent material in an amount of from about 0.05 wt. % to about 1.0 wt. %, based on the weight of the rendered fat.

Impurities which may be removed include, but are not limited to, polyethylene, phosphorus-containing compounds, including phosphorus gums, metals (such as, but not limited to, sodium, potassium, magnesium, calcium, iron, aluminum, and lead), chlorophyll, water, soap, and free fatty acids.

Subsequent to contacting the rendered fat with at least one adsorbent material, the at least one adsorbent material may be removed from the rendered fat by physical separation according to methods known to those skilled in the art, such as, for example, filtration and/or centrifugation.

The treatment of the rendered fat with at least one adsorbent material as hereinabove described provides a purified rendered fat which meets accepted standards for the trade and transportation of rendered fat.

In a non-limiting embodiment, the rendered fat is contacted with at least one adsorbent material and at least one other agent for purifying rendered fat. In another non-limiting embodiment, the at least one other agent for purifying the rendered fat is at least one acid.

Thus, in accordance with another aspect of the present invention, there is provided a method of purifying a rendered fat by contacting the rendered fat with (i) at least one adsorbent material and (ii) at least one acid.

The at least one adsorbent material may, in non-limiting embodiments, be selected from those hereinabove described, and the rendered fat may be contacted with the at least one adsorbent material in amounts as hereinabove described.

In a non-limiting embodiment, the at least one adsorbent material is magnesium silicate, including natural and synthetic magnesium silicate, and which may be selected from those hereinabove described.

The rendered fat may be contacted with the at least one acid prior to, concurrently with, or subsequent to contacting the rendered fat with the at least one adsorbent material.

In a non-limiting embodiment, the rendered fat is contacted with the at least one acid prior to contacting the rendered fat with the at least one adsorbent material.

In another non-limiting embodiment, the at least one rendered fat is contacted with the at least one acid concurrently with the at least one adsorbent material.

In another non-limiting embodiment, the rendered fat is contacted with the at least one acid subsequent to contacting the rendered fat with the at least one adsorbent material.

In a non-limiting embodiment, the at least one acid is an inorganic acid. In another non-limiting embodiment, the at least one inorganic acid is phosphoric acid.

In another non-limiting embodiment, the at least one acid is an organic acid.

In a non-limiting embodiment, the at least one organic acid is selected from the group consisting of citric acid, malic acid, ascorbic acid, and mixtures thereof. In another non-limiting embodiment, the at least one organic acid is citric acid. In yet another non-limiting embodiment, the at least one organic acid is malic acid. In a further non-limiting embodiment, the at least one organic acid is ascorbic acid.

The at least one acid may be in the form of a solution or may be a solid, such as a powder, for example.

In a non-limiting embodiment, the rendered fat is contacted with the at least one adsorbent material and the at least one acid at a temperature of from about 180° F. to about 260° F.

In a non-limiting embodiment, the at least one acid is in the form of an aqueous solution. In another non-limiting embodiment, the at least one acid is present in the aqueous solution in an amount of from about 10% to about 80% by weight. In yet another non-limiting embodiment, the at least one acid is present in the aqueous solution in an amount of about 50% by weight.

In a non-limiting embodiment, the rendered fat is contacted with the aqueous solution of the at least one acid in an amount of from about 0.01 wt. % to about 5.0 wt. %, based on the weight of the rendered fat. In another non-limiting embodiment, the rendered fat is contacted with the aqueous solution of the at least one acid in an amount of from 0.5 wt. % to about 4.0 wt. %, based on the weight of the rendered fat.

In another non-limiting embodiment, the at least one acid is in the form of a solid, such as a solid powder. In a non-limiting embodiment, the rendered fat is contacted with a solid powder of the at least one acid in an amount of from about 0.01 wt. % to about 5.0 wt. %, based on the weight of the rendered fat. In another non-limiting embodiment, the rendered fat is contacted with a solid powder of the at least one acid in an amount of from about 0.5 wt. % to about 4.0 wt. %, based on the weight of the rendered fat.

Subsequent to contacting the rendered fat with the at least one adsorbent material and the at least one acid, the at least one adsorbent material and the at least one acid may be removed from the rendered fat by physical separation according to methods known to those skilled in the art, such as, for example, filtration and/or centrifugation.

Impurities which may be removed from the rendered fat may be those hereinabove described, and in particular, polyethylene.

The invention now will be described with respect to the following examples. It is to be understood, however, that the scope of the present invention is not intended to be limited thereby.

EXAMPLE 1

Procedure: Rendered fat was obtained from a commercial renderer in Kentucky and tested for its polyethylene level. The polyethylene levels also were tested in rendered fat that had been treated with Ulrich Chemical diatomaceous earth, Dallas D-SOL D60, the silica hydrogel product W.R. Grace Trisyl 600, or the silica xerogel product PQ Britesorb C935.

Treatment:
1) 123.75 g of the rendered fat were heated to 180° F. in a 250 mL beaker.
2) 1.25 g of one of the above adsorbents then were added to the rendered fat and allowed to stir for 10 minutes. The sample then was filtered using vacuum filtration in an Ahlstrom 939 filter.

The polyethylene test was performed based on AOCS method Ca 16-75.
1) Filters were pre-dried in the oven at 105° C. and a wash bottle of methanol was placed in the refrigerator.
2) The sample was heated to a temperature of 60-70° C. in a water bath. The sample then was stirred with a magnetic stir bar for 3 min to allow the polyethylene to be distributed throughout the sample.
3) Next, 50 g of sample was weighed into a 600 mL beaker and a 75 mL solution of sulfuric acid/ethanol (10% solution, v/v) was added. The beaker then was covered and stirred for 5 min at 60-70° C. on a hot plate.
4) The beaker then was removed from the hot plate and allowed to cool to a temperature of below 35° C., during which the sample was stirred continuously with a magnetic stirrer. When the sample had reached the appropriate temperature, 270 mL of chloroform were added and allowed to mix for approximately 3 min.
5) The sample then was filtered through a California State modified Buchner funnel attached to a 1 L filtration flask. Two pieces of pre-dried glass fiber GFA filter paper were placed in the funnel and were held in place by a retaining ring. Chloroform was used to wet the filter paper before the contents of the beaker were poured in.
6) After the filtration the filtrate was discarded. Meanwhile tetrachloroethylene was heated in two 250 mL beakers, one containing exactly 75 mL and the other containing about 150 mL. Boiling chips were placed in the beakers and the tetrachloroethylene was brought to a boil. 7) The filter paper from the previous filtration then was placed in the beaker with 75 mL of tetrachloroethylene and stirred for 2 min. The filter paper was not removed.
8) A filtration was set up using a porcelain Buchner funnel and a Whatman No. 4 filter paper covered by 2 pieces of glass fiber GFA filter paper. On top of this a retaining ring was placed. The other beaker with 150 mL of tetrachloroethylene was used to fill a Guch Universal wash bottle. This was used to pre-wet the filter.
9) The contents of the beaker containing the 75 mL of tetrachloroethylene and filter paper then were filtered through the above apparatus. The funnel and beaker were washed several times with the contents of the wash bottle.
10) 175 mL of the pre-chilled methanol were then added to the contents of the filtration flask and the flask was placed in an ice bath for 10 min.
11) Two pieces of the pre-dried glass fiber GFA filter paper then were weighed and placed in the washed California State Buchner funnel followed by placing the retaining ring. The filter paper then was wet with the chilled methanol before the contents of the previous filtration flask were filtered through. The flask and filter paper then were washed with about 50 mL of methanol.
12) The two pieces of weighed filter paper then were placed in a 105° C. oven for 20 minutes before being taken out and placed in a desiccator. Then they were weighed again.

The polyethylene (PE) content was determined using the following formula:

$$\text{Polyethylene, ppm} = \frac{\text{mass of precipitate, g}}{\text{mass of sample, g}} \times 10^6$$

Results:
The results in Table 1 below show that adsorbent synthetic magnesium silicate, silica hydrogel, and silica xerogel filter aids all removed polyethylene in solution with rendered fat while a standard diatomaceous earth (D.E.) filter aid was unsatisfactory.

TABLE 1

| SAMPLE | Treatment Temp | (1st test) ppm PE | (2nd test) ppm PE | Avg PE (ppm) | % PE Removal |
|---|---|---|---|---|---|
| Unfiltered Blank | — | 105.9 | 91.9 | 98.9 | — |
| Filtered Blank | 180° F. | 102 | 102 | 102 | — |
| Treated w/ 1% D.E. | 180° F. | 73.9 | | 73.9 | 27.5 |
| Treated w/ 1% D60 | 180° F. | 16 | 12 | 14 | 86.3 |
| Treated w/ 1% Trisyl 600 | 180° F. | 16 | 4 | 10 | 90.2 |
| Treated w/ 1% Britesorb C935 | 180° F. | 10 | 10 | 10 | 90.2 |

EXAMPLE 2

Procedure: Rendered fat was obtained from a commercial renderer in Minnesota and tested for its polyethylene level. The polyethylene levels also were tested in rendered fat that had been treated with Dallas D-SOL D60 & Magnesol R60 at different temperatures.

Treatment:
1) 98.00 g of the rendered fat were heated to 200° F. in a 250 mL beaker.
2) 1.00 g of each of the above adsorbents then was added concurrently to the rendered fat and allowed to stir for 10 minutes. The sample then was filtered using vacuum filtration in an Ahlstrom 939 filter.

The polyethylene test was performed based on AOCS method Ca 16-75.
1) Filters were pre-dried in the oven at 105° C. and a wash bottle of methanol was placed in the refrigerator.
2) The sample was heated to a temperature of 60-70° C. in a water bath. The sample then was stirred with a magnetic stir bar for 3 min to allow the polyethylene to be distributed throughout the sample.
3) Next, 50 g of sample were weighed into a 600 mL beaker and a 75 mL solution of sulfuric acid/ethanol (10% solution, v/v) was added. The beaker then was covered and stirred for 5 min at 60-70° C. on a hot plate.
4) The beaker then was removed from the hot plate and allowed to cool to a temperature of below 35° C., during which the sample was stirred continuously with a magnetic stirrer. When the sample had reached the appropriate temperature, 270 mL of chloroform were added and allowed to mix for approximately 3 min.
5) The sample then was filtered through a California State modified Buchner funnel attached to a 1 L filtration flask. Two pieces of pre-dried glass fiber GFA filter paper were placed in the funnel and were held in place by a retaining ring. Chloroform was used to wet the filter paper before the contents of the beaker were poured in.
6) After the filtration the filtrate was discarded. Meanwhile tetrachloroethylene was heated in two 250 mL beakers, one containing exactly 75 mL and the other containing about 150 mL. Boiling chips were placed in the beakers and the tetrachloroethylene was brought to a boil.
7) The filter paper from the previous filtration then was placed in the beaker with 75 mL of tetrachloroethylene and stirred for 2 min. The filter paper was not removed.
8) A filtration was set up using a porcelain Buchner funnel and a Whatman No. 4 filter paper covered by 2 pieces of glass fiber GFA filter paper. On top of this a retaining ring was placed. The other beaker with 150 mL of tetrachloroethylene was used to fill a Guch Universal wash bottle. This was used to pre-wet the filter.
9) The contents of the beaker containing the 75 mL of tetrachloroethylene and filter paper then were filtered through the above apparatus. The funnel and beaker were washed several times with the contents of the wash bottle.
10) 175 mL of the pre-chilled methanol then were added to the contents of the filtration flask and it was placed in an ice bath for 10 min.
11) Two pieces of the pre-dried glass fiber GFA filter paper then were weighed and placed in the washed California State Buchner funnel followed by the retaining ring. The filter paper then was wet with the chilled methanol before the contents of the previous filtration flask were filtered through. The flask and filter paper then were washed with about 50 mL of methanol.
12) The two pieces of weighed filter paper then were placed in a 105° C. oven for 20 minutes before being taken out and placed in a desiccator. Then they were weighed again.

The polyethylene content was determined using the following formula:

$$\text{Polyethylene, ppm} = \frac{\text{mass of precipitate, g}}{\text{mass of sample, g}} \times 10^6$$

Results:

The results in Tables 2 and 3 below show that blends of adsorbent synthetic magnesium silicate remove polyethylene in solution with rendered fat and that the lower the process temperature, the lower the residual polyethylene (PE).

TABLE 2

| SAMPLE | Treatment Temp | % FFA (free fatty acids) | Soap (ppm) | Photometric Color | KF % Water | P (phosphorus) (ppm) | S (sulfur) (ppm) | PE (ppm) |
|---|---|---|---|---|---|---|---|---|
| Unfiltered Beef Tallow | — | 5.13 | 120 | 147.7 | 0.0392 | 216 | 22 | 2282 |
| 1% D60 & 1% R60 Treatment | 200° F. | 4.72 | 88 | 16.1 | 0.0795 | 56 | 17 | 2 |

TABLE 3

| SAMPLE | Treatment Temp | % FFA | Soap (ppm) | Photometric Color | KF % Water | P (ppm) | S (ppm) | PE (ppm) |
|---|---|---|---|---|---|---|---|---|
| Unfiltered Beef Tallow | — | 3.64 | 69 | 39.3 | 0.0158 | 105 | 30 | 242 |
| 1% D60 & 1% R60 Treatment | 220° F. | 3.53 | 180 | −22.3 | 0.0375 | 29 | 15 | 58 |
| 1% D60 & 1% R60 Treatment | 260° F. | 3.50 | 211 | −0.6 | 0.0387 | 43 | 30 | 224 |

EXAMPLE 3

Procedure: Rendered fat was obtained from a commercial renderer in Texas and tested for its polyethylene level. The polyethylene levels were also tested in rendered fat that had been treated with Magnesol R60 and combinations of a citric acid solution (50%) with Magnesol R60.

Treatment:

1) The rendered fat was weighed out and was heated to 200° F. in a 250 mL beaker.

2) First the correct weight % of acid was added to the rendered fat and allowed to stir for 10 minutes. If no acid were added then skip this step and proceed to step 3.
3) Next the correct weight % of Magnesol R60 was added and allowed to stir for 10 minutes.
4) Then the sample was then filtered using vacuum filtration and an Ahlstrom 939 filter.

The polyethylene test was performed based on AOCS method Ca 16-75.
1) Filters were pre-dried in the oven at 105° C. and a wash bottle of methanol was placed in the refrigerator.
2) The sample was heated to a temperature of 60-70° C. in a water bath. The sample then was stirred with a magnetic stir bar for 3 min to allow the polyethylene to be distributed throughout the sample.
3) Next, 50 g of sample were weighed into a 600 mL beaker and a 75 mL solution of sulfuric acid/ethanol (10% solution, v/v) was added. The beaker then was covered and stirred for 5 min at 60-70° C. on a hot plate.
4) The beaker then was removed from the hot plate and allowed to cool to a temperature of below 35° C., during which the sample was stirred continuously with a magnetic stirrer. When the sample had reached the appropriate temperature, 270 mL of chloroform were added and allowed to mix for approximately 3 min.
5) The sample then was filtered through a California State modified Buchner funnel attached to a 1 L filtration flask. Two pieces of pre-dried glass fiber GFA filter paper were placed in the funnel and were held in place by a retaining ring. Chloroform was used to wet the filter paper before the contents of the beaker were poured in.
6) After the filtration the filtrate was discarded. Meanwhile tetrachloroethylene was heated in two 250 mL beakers, one containing exactly 75 mL and the other containing about 150 mL. Boiling chips were placed in the beakers and the tetrachloroethylene was brought to a boil.
7) The filter paper from the previous filtration then was placed in the beaker with 75 mL of tetrachloroethylene and stirred for 2 min. The filter paper was not removed.
8) A filtration was set up using a porcelain Buchner funnel and a Whatman No. 4 filter paper covered by 2 pieces of glass fiber GFA filter paper. On top of this a retaining ring was placed. The other beaker with 150 mL of tetrachloroethylene was used to fill a Guch Universal wash bottle. This was used to pre-wet the filter.
9) The contents of the beaker containing the 75 mL of tetrachloroethylene and filter paper then were filtered through the above apparatus. The funnel and beaker were washed several times with the contents of the wash bottle.
10) 175 mL of the pre-chilled methanol then were added to the contents of the filtration flask and it was placed in an ice bath for 10 min.
11) Two pieces of the pre-dried glass fiber GFA filter paper were then weighed and placed in the washed California State Buchner funnel followed by the retaining ring. The filter paper then was wet with the chilled methanol before the contents of the previous filtration flask were filtered through. The flask and filter paper then were washed with about 50 mL of methanol.
12) The two pieces of weighed filter paper then were placed in a 105° C. oven for 20 minutes before being taken out and placed in a desiccator. Then they were weighed again.
The polyethylene content was determined using the following formula:

$$\text{Polyethylene, ppm} = \frac{\text{mass of precipitate, g}}{\text{mass of sample, g}} \times 10^6$$

Results:

The results in Table 4 below show that the addition of an acid in conjunction with an adsorbent synthetic magnesium silicate treatment improves the removal of polyethylene in solution with rendered fat and that the higher dose of acid the lower the residual polyethylene (PE).

TABLE 4

| SAMPLE | Treatment Temp | % FFA | Soap (ppm) | KF % Water | PE (ppm) |
|---|---|---|---|---|---|
| 1 gallon of beef tallow | — | 13.46 | 6531 | 0.1789 | 254 |
| 2% R60 | 200° F. | 13.01 | 6331 | 0.0436 | 25 |
| 2% 50% Citric Acid Solution and then 2% R60 | 200° F. | 13.2 | 58 | 0.0715 | ND |
| 3% 50% Citric Acid Solution and then 2% R60 | 200° F. | 13.19 | 0 | 0.0682 | ND |

The disclosures of all patents and publications (including published patent applications) are hereby incorporated by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A method of purifying a rendered fat, comprising: contacting said rendered fat with at least one adsorbent material and at least one acid.

2. The method of claim 1 wherein said rendered fat is contacted with said at least one acid prior to contacting said rendered fat with said at least one adsorbent material.

3. The method of claim 1 wherein said rendered fat is contacted with said at least one acid concurrently with contacting said rendered fat with said at least one adsorbent material.

4. The method of claim 1 wherein said rendered fat is contacted with said at least one acid subsequent to contacting said edible oil or fat with said at least one adsorbent material.

5. The method of claim 1 wherein said at least one acid is at least one inorganic acid.

6. The method of claim 5 wherein said at least one inorganic acid is phosphoric acid.

7. The method of claim 1 wherein said at least one acid is at least one organic acid.

8. The method of claim 7 wherein said at least one organic acid is selected from the group consisting of citric acid, malic acid, ascorbic acid, and mixtures thereof.

9. The method of claim 8 wherein said at least one organic acid is citric acid.

10. The method of claim 8 wherein said at least one organic acid is malic acid.

11. The method of claim 8 wherein said at least one organic acid is ascorbic acid.

12. The method of claim 1 wherein said at least one adsorbent material is selected from the group consisting of magnesium silicate, magnesium aluminum silicate, calcium silicate, sodium silicates, activated carbon, silica gel, magnesium phosphate, metal hydroxides, metal oxides, metal carbonates, metal bicarbonates, sodium sesquicarbonate, metal silicates, bleaching earths, bentonite clay, alumina, and mixtures thereof.

13. The method of claim 12 wherein said at least one adsorbent material is magnesium silicate.

14. The method of claim 13 wherein said magnesium silicate has a surface area of at least 300 square meters per gram.

15. The method of claim 14 wherein said magnesium silicate has a surface area of at least 400 to about 700 square meters per gram.

16. The method of claim 13 wherein said magnesium silicate has a particle size of from about 20 microns to about 175 microns.

17. The method of claim 13 wherein said magnesium silicate has a bulk density of from about 15 to about 35 pounds per cubic foot.

18. The method of claim 13 wherein said magnesium silicate is an amorphous hydrous precipitated synthetic magnesium silicate, said magnesium silicate having been treated to reduce the pH thereof to less than about 9.0.

19. The method of claim 18 wherein said magnesium silicate has a pH in a 5% slurry of from about 8.2 to about 8.9.

20. The method of claim 19 wherein said magnesium silicate has a pH in a 5% slurry of from 8.5 about to about 8.8.

21. The method of claim 13 wherein said magnesium silicate has a surface area of no more than 150 square meters per gram.

22. The method of claim 21 wherein said magnesium silicate has a surface area of about 50 square meters per gram to about 150 square meters per gram.

23. The method of claim 22 wherein said magnesium silicate has a mole ratio of MgO to $SiO_2$ of from about 1:3.0 to about 1:3.8 and a pH in a 5% water suspension of from about 9.5 to about 10.5.

24. The method of claim 13 wherein said magnesium silicate has a pH of from about 9.0 to about 9.5.

25. The method of claim 1 wherein said rendered fat is contacted with said at least one adsorbent material in an amount of from about 0.01 wt. % to about 5.0 wt. %, based on the weight of said rendered fat.

26. The method of claim 25 wherein said rendered fat is contacted with said at least one adsorbent material in an amount of from about 0.05 wt. % to about 1.0 wt. %, based on the weight of said rendered fat.

27. The method of claim 1 wherein polyethylene is removed from said rendered fat.

28. The method of claim 1 wherein metals are removed from said rendered fat.

29. The method of claim 1 wherein chlorophyll is removed from said rendered fat.

30. The method of claim 1 wherein phosphorus-containing compounds are removed from said rendered fat.

31. The method of claim 1 wherein said at least one acid is in the form of an aqueous solution.

32. The method of claim 31 wherein said at least one acid is present in said aqueous solution in an amount of from about 10% to about 80% by weight.

33. The method of claim 32 wherein said at least one acid is present in said aqueous solution in an amount of about 50% by weight.

34. The method of claim 31 wherein said rendered fat is contacted with said aqueous solution of said at least one organic acid in an amount of from about 0.01 wt. % to about 5.0 wt. %, based on the weight of the rendered fat.

35. The method of claim 34 wherein said rendered fat is contacted with said aqueous solution of said at least one organic acid in an amount of from about 0.5 wt. % to about 4.0 wt. %, based on the weight of the rendered fat.

36. The method of claim 1 wherein said at least one acid is in the form of a solid powder.

37. The method of claim 36 wherein said rendered fat is contacted with said solid powder of said acid in an amount of from about 0.01 wt. % to about 5.0 wt. %, based on the weight of the rendered fat.

38. The method of claim 37 wherein said rendered fat is contacted with said solid powder of said organic acid in an amount of from about 0.5 wt. % to about 4.0 wt. %, based on the weight of the rendered fat.

39. The method of claim 1 wherein said rendered fat is contacted with said at least one adsorbent material and said at least one acid at a temperature of from about 180° F. to about 260° F.

* * * * *